United States Patent
Hwang

(10) Patent No.: US 9,663,919 B2
(45) Date of Patent: May 30, 2017

(54) CONSTRUCTION MACHINE

(71) Applicant: VOLVO CONSTRUCTION EQUIPMENT AB, Eskilstuna (SE)

(72) Inventor: Soo-Bong Hwang, Gyeongsangnam-do (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/903,150

(22) PCT Filed: Jul. 8, 2013

(86) PCT No.: PCT/KR2013/006037
§ 371 (c)(1),
(2) Date: Jan. 6, 2016

(87) PCT Pub. No.: WO2015/005506
PCT Pub. Date: Jan. 15, 2015

(65) Prior Publication Data
US 2016/0138242 A1    May 19, 2016

(51) Int. Cl.
*E02F 9/18* (2006.01)
*B60K 15/063* (2006.01)
(Continued)

(52) U.S. Cl.
CPC .............. *E02F 9/08* (2013.01); *B60K 15/063* (2013.01); *B60K 15/067* (2013.01); *E02F 3/32* (2013.01);
(Continued)

(58) Field of Classification Search
CPC ......... E02F 9/08; E02F 9/0833; E02F 9/0866; E02F 9/0883; E02F 9/18; B60K 15/063;
(Continued)

(56) References Cited

U.S. PATENT DOCUMENTS 2,325,089 A * 7/1943 Zeilman .................. B66C 23/74
                                                    212/178
4,013,300 A * 3/1977 Berger .................... B60K 15/00
                                                    180/68.5
(Continued)

FOREIGN PATENT DOCUMENTS

CN        201195496 Y    2/2009
CN        103180158 A    6/2013
(Continued)

OTHER PUBLICATIONS

International Search Report (in English and Korean) and Written Opinion of the International Searching Authority (Korean) for PCT/KR2013/006037, mailed Apr. 9, 2014; ISA/KR.
(Continued)

*Primary Examiner* — Frank Vanaman
(74) *Attorney, Agent, or Firm* — Harness, Dickey & Pierce, P.L.C.

(57) ABSTRACT

A construction machine in which a fuel tank is mounted to enable the machine to work for a long time through one fueling. The construction machine includes a lower driving structure; an upper frame mounted on the lower driving structure to horizontally swivel; a cab mounted on one side of an upper surface of the upper frame; a mounting portion formed to extend from a rearmost side of a center frame of the upper frame; a counterweight detachably installed on the mounting portion through a fastening member, and having a storage space portion of which a front surface and an upper surface are opened; a fuel tank coupled to the storage space portion and detachably fixed to the mounting portion through another fastening member that fixes the counterweight to the mounting portion in order to separate the fuel tank from the counterweight in a state where the counterweight that is coupled to the fuel tank is mounted on the mounting portion; an engine room mounted in front of the (Continued)

fuel tank of the upper frame; and a hydraulic fluid tank installed on one side of a front portion of the engine room.

9 Claims, 8 Drawing Sheets

(51) Int. Cl.
  *E02F 9/08* (2006.01)
  *B60K 15/067* (2006.01)
  *E02F 3/32* (2006.01)
  *E02F 9/16* (2006.01)

(52) U.S. Cl.
  CPC .......... *E02F 9/0833* (2013.01); *E02F 9/0866* (2013.01); *E02F 9/0883* (2013.01); *E02F 9/16* (2013.01); *E02F 9/18* (2013.01); *B60K 2015/0638* (2013.01); *B60Y 2200/412* (2013.01)

(58) Field of Classification Search
  CPC .......... B60K 15/067; B60K 2015/0638; B60Y 2200/412
  See application file for complete search history.

(56) References Cited

U.S. PATENT DOCUMENTS

| | | | |
|---|---|---|---|
| 6,481,748 B1 | 11/2002 | Okuda et al. | |
| 2007/0072063 A1* | 3/2007 | Imashige | E02F 9/18 429/96 |
| 2009/0180205 A1 | 7/2009 | Kim | |
| 2011/0005853 A1* | 1/2011 | Kamiya | B60K 13/04 180/296 |
| 2012/0285757 A1* | 11/2012 | Atarashi | B60K 1/04 180/68.1 |
| 2013/0343853 A1* | 12/2013 | Sato | E02F 9/0866 414/719 |
| 2014/0000973 A1* | 1/2014 | O'Donnell | E02F 9/0858 180/165 |
| 2015/0114748 A1* | 4/2015 | Hanada | E02F 9/0866 180/309 |
| 2015/0139768 A1* | 5/2015 | Egawa | E02F 9/18 414/719 |

FOREIGN PATENT DOCUMENTS

| | | |
|---|---|---|
| EP | 1770223 A2 | 4/2007 |
| EP | 2168805 A2 | 3/2010 |
| JP | 2000080679 A | 3/2000 |
| JP | 2001040705 A | 2/2001 |
| JP | 2001106479 A | 4/2001 |
| JP | 2004124500 A | 4/2004 |
| JP | 2004353532 A | 12/2004 |
| JP | 2006177118 A | 7/2006 |
| JP | 2013-064232 A | 4/2013 |
| KR | 1020050025719 A | 3/2005 |
| KR | 2010-0091715 A | 8/2010 |
| WO | WO-2013-065879 A1 | 5/2013 |

OTHER PUBLICATIONS

Extended European Search Report issued by the European Patent Office (EPO) on Feb. 22, 2017 concerning corresponding EP Patent Application No. 13888985.2 (7 pages).

* cited by examiner

Prior Art

Prior Art

CONSTRUCTION MACHINE

CROSS-REFERENCE TO RELATED APPLICATION

This application is a 371 U.S. National Stage of International Application No. PCT/KR2013/006037, filed on Jul. 8, 2013. The entire disclosure of the above application is incorporated herein by reference.

TECHNICAL FIELD

The present invention relates to construction machines and, more particularly, to a construction machine in which a fuel tank is mounted to enable the machine to work for a long period through one fueling.

BACKGROUND ART

As illustrated in FIG. 1, a construction machine according to a conventional art includes: a lower driving structure 1; an upper frame 2 mounted on the lower driving structure 1 to horizontally swivel; a cab 3 mounted on one side of an upper surface of the upper frame 2; a fuel tank 4 installed on one surface of a front part of a side opposite to a side at which the cab 3 of the upper frame 2 is mounted; a hydraulic fluid tank 5 installed to be adjacent to a rear part of the fuel tank 4 of the upper frame 2; and a counterweight 6 installed at a position corresponding to the rearmost part of the upper frame 2; and a working device 10 fixed to one side of a front part of the upper frame 2 and including a boom 7, an arm 8, and a bucket 9 that are operated by respective hydraulic cylinders.

Since a volume of the fuel tank 4 is limited, the fuel tank does not meet the requirements for use in a construction machine in a work condition in which the time of use of the fuel tank is 10 hours or more, namely, in remote areas where working is performed for 2-3 days with one fueling. Due to this, there has been an ongoing demand for solving the lack of a volume of the fuel tank. Further, the absence of a storage space for tools has also been pointed out.

As illustrated in FIG. 2, a construction machine according to another conventional art includes: a lower driving structure 1; an upper frame 2 mounted on the lower driving structure 1 to horizontally swivel; a cab 3 mounted on one side of an upper surface of the upper frame 2; a fuel tank 4 installed on one surface of a front part of a side opposite to a side at which the cab 3 of the upper frame 2 is mounted; a hydraulic fluid tank 5 installed to be adjacent to a rear part of the fuel tank 4 of the upper frame 2; and a counterweight 6 installed at a position corresponding to the rearmost part of the upper frame 2; a working device 10 fixed to one side of a front part of the upper frame 2 and including a boom 7, an arm 8, and a bucket 9 that are operated by respective hydraulic cylinders; and an additional fuel tank 4a installed to be adjacent to a front part of the counterweight 6 of the upper frame 2.

According to the construction machine illustrated in FIG. 2, despite the fact that a volume of the fuel tank can be increased by the fuel tank 4 and the additional fuel tank 4a, inconvenience of the lack of a storage space in which a storage space in which tools required for working can be loaded has not been improved.

In addition, when the fuel tank 4 and the additional fuel tank 4a are installed, since a separate junction tank 11 is used, it is problematic in that corresponding components are added.

Also, since left and right sides of the additional fuel tank 4a are exposed to the outside, it is problematic in that the additional fuel tank 4a can be damaged by coming into contact with an external object during turning work.

In addition, since a fuel injection port (fuel filling hole) of the additional fuel tank 4a is adjacent to a muffler of an engine room, it is problematic in that a fire danger may occur.

DISCLOSURE

Technical Problem

Accordingly, the present invention has been made keeping in mind the above problems, and an object of the present invention is to provide a construction machine in which a fuel tank or a counterweight can be individually separated from an upper frame after the counterweight coupled to the fuel tank has been mounted to the upper frame.

Another object of the present invention is to provide a construction machine that can prevent a fuel tank from coming into contact with an external object so as to protect the fuel tank because left and right and outer surfaces of the fuel tank are surrounded and supported by a counterweight.

A further object of the present invention is to provide a construction machine that is configured such that left and right sides of a counterweight are not filled with an inner filler so as to be utilized as a storage space.

Technical Solution

In order to accomplish the objects of the present invention, according to an embodiment of the present invention, there is a construction machine including: a lower driving structure; an upper frame mounted on the lower driving structure to horizontally swivel; a cab mounted on one side of an upper surface of the upper frame; a mounting portion formed to extend from a rearmost side of a center frame of the upper frame; a counterweight detachably installed on the mounting portion through a fastening member, the counterweight having a storage space portion of which a front surface and an upper surface are opened; a fuel tank coupled to the storage space portion and detachably fixed to the mounting portion through another fastening member that fixes the counter weight to the mounting portion in order to separate the fuel tank from the counterweight in a state where the counterweight that is coupled to the fuel tank is mounted on the mounting portion; an engine room mounted in front of the fuel tank of the upper frame; and a hydraulic fluid tank installed on one side of a front part of the engine room.

In order to accomplish the above and other objects of the present invention, according to another embodiment of the present invention, there is a construction machine including: a lower driving structure; an upper frame mounted on the lower driving structure to horizontally swivel; a cab mounted on one side of an upper surface of the upper frame; a mounting portion formed to extend from a rearmost side of a center frame of the upper frame; a counterweight detachably installed on the mounting portion through a fastening member, the counterweight having a storage space portion of which a front surface and an upper surface are opened; a fuel tank coupled to the storage space portion, the fuel tank being detachably fixed to the mounting portion through another fastening member and being detachably fixed at a predetermined position of the counterweight through still another fastening member in order to separate the fuel tank from the counterweight in a state where the counterweight that is coupled to the fuel tank is mounted on the mounting portion; an engine room mounted in front of the fuel tank of the upper frame; and a hydraulic fluid tank installed on one side of a front part of the engine room.

The construction machine may further include a wing-shaped protection member formed to project from left and right sides of the counterweight to a front part and to surround an outer surface of the fuel tank that is coupled to the storage space portion in order to prevent the fuel tank from coming into contact with an external object.

A fuel injection port of the fuel tank may be formed on an opposite side of a muffler of the engine room.

The construction machine may further include a maintenance platform installed on a side surface of the upper frame and formed to extend up to a rear part of one side surface of the counterweight for boarding during fuel injection into the fuel tank.

The construction machine may further include a hand rail installed on one side of an upper surface of the counterweight to be grasped during the fuel injection into the fuel tank.

The counterweight may include a body portion filled with predetermined inner fillers to maintain a predetermined weight, and a storage portion formed at left and right ends of the body portion and having a vacancy that is not filled with the inner fillers.

The construction machine may further include a fuel injection pump installed on one side of the storage portion to inject fuel into the fuel tank.

The construction machine may further include a storage box installed in front of the hydraulic fluid tank of the upper frame.

The still another fastening member for detachably fixing the fuel tank to the counterweight may fix the fuel tank to at least one of left and right side surfaces, a top surface, and a bottom surface of the counterweight.

The construction machine may further include a bracket formed on the counterweight and coupled to a fastening member to install the counterweight coupled to the fuel tank on the mounting portion.

Advantageous Effects

According to the present invention having the configuration described above, only a fuel tank is separated from a counterweight after a counterweight coupled to the fuel tank has been mounted to an upper frame, so that a loss time required for simultaneously disassembling the fuel tank and the counterweight can be reduced.

In addition, a volume of the fuel tank is increased so that convenience can be provided to users.

In addition, since left, right and outer surfaces of the fuel tank are surrounded and supported by the counterweight, the fuel tank can be prevented from being damaged due to contact with an external object.

Also, left and right sides of the counterweight are not filled with inner fillers for maintaining a weight so as to be utilized as a storage space in which a fuel injection pump is installed.

In addition, a fuel injection port is formed on an opposite side of a muffler of an engine room so that fire can be prevented from occurring.

Also, when a corrosion-resistant phosphate coating layer is formed on an inner surface of the fuel tank, since it is easy to handle the fuel tank compared to a conventional structure in which the fuel tank and the counterweight are integrally formed, workability can be improved.

DESCRIPTION OF THE REFERENCE NUMERALS IN THE DRAWINGS

Figure 1:
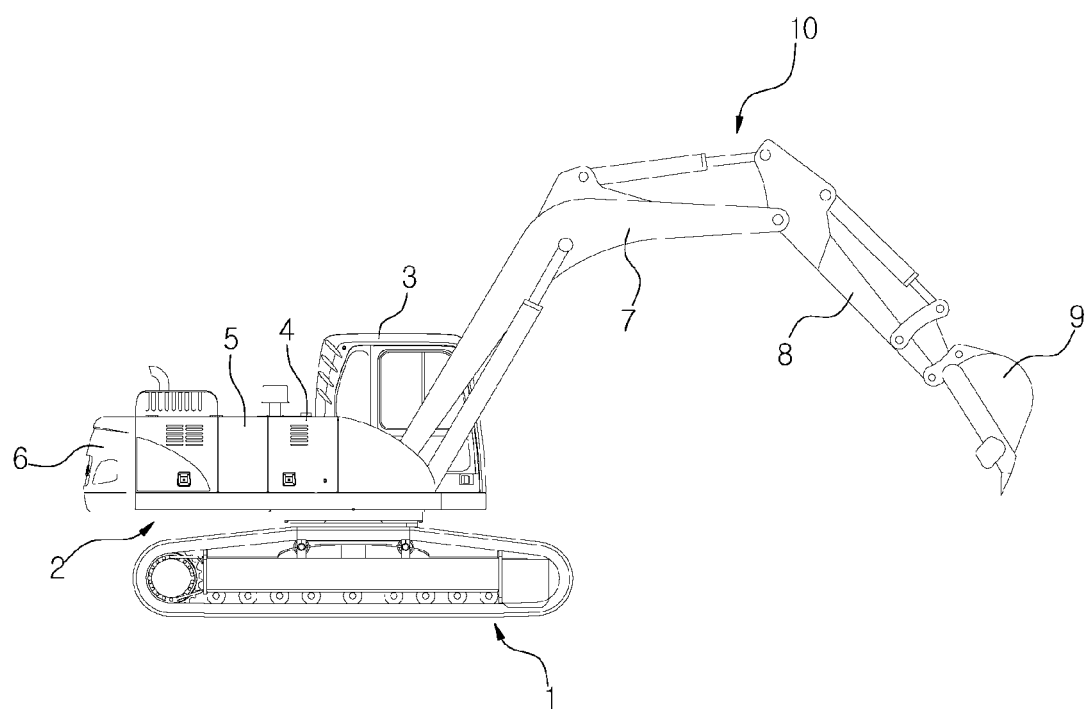
FIG. 1 is a schematic view showing a construction machine according to a conventional art.
Figure 2:
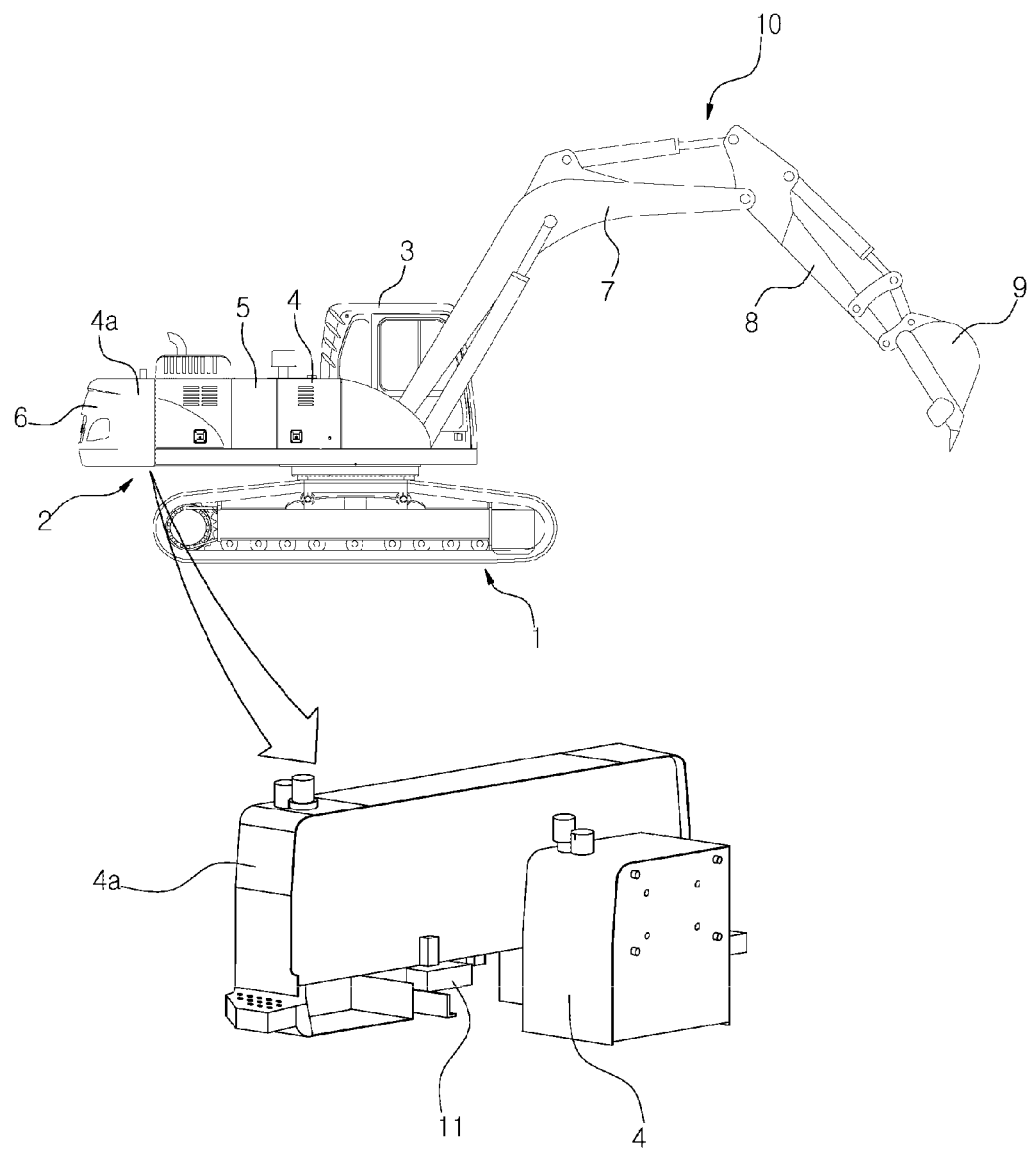
FIG. 2 is a schematic view showing a construction machine according to another conventional art.

12; Center frame
13; Mounting portion
14; Counterweight
15; Storage space portion
16; Fuel tank
17, 18; Fastening members
19; Bracket
20; Engine room
21; Hydraulic fluid tank
22; Wing-shaped protection member
23; Fuel injection port
24; Maintenance platform
25; Handrail
26; Body portion
27; Storage portion
28; Fuel injection pump
29; Storage box

BEST MODE

A construction machine according to preferred embodiments of the present invention will be described in detail with reference to the accompanying drawings.

Figure 3:
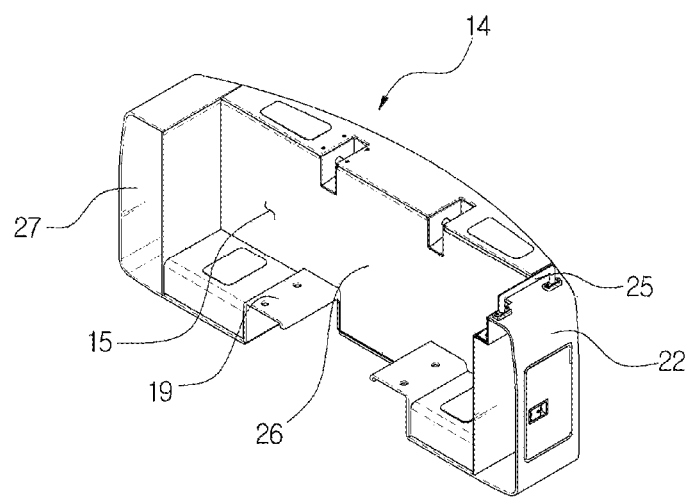
FIG. 3 is a perspective view of a counterweight of a construction machine according to a preferred embodiment of the present invention.
Figure 4:
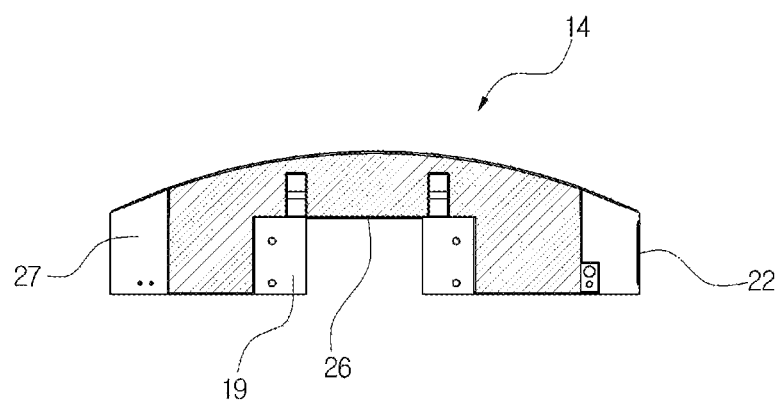
FIG. 4 is a view showing a portion of the counterweight illustrated in FIG. 3 that is filled with inner fillers.
Figure 5:
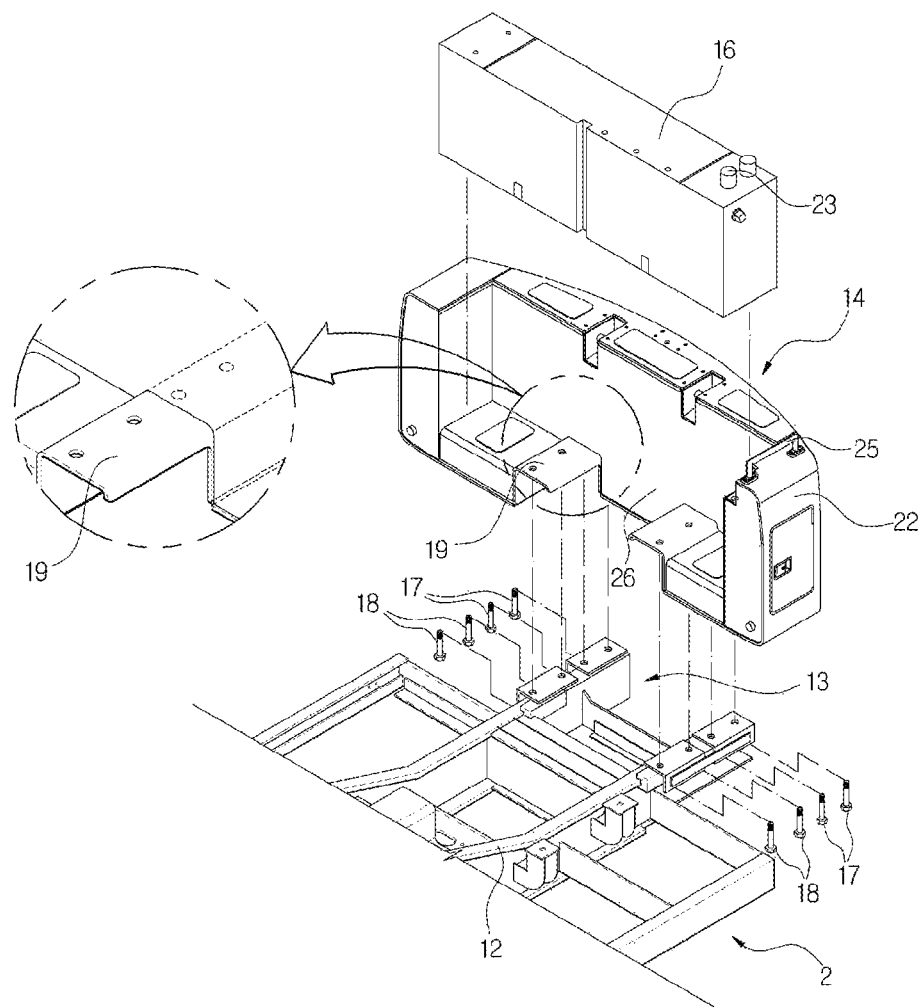
FIG. 5 is an exploded perspective view showing main portions extracted from the construction machine according to the preferred embodiment of the present invention.
Figure 6:
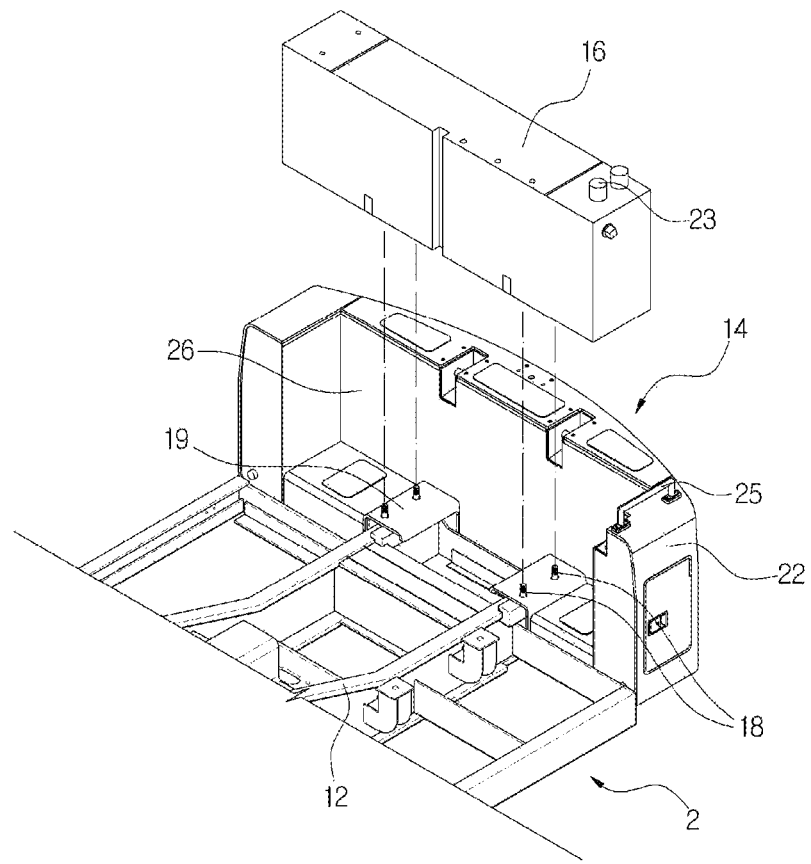
FIG. 6 is a view showing a form of the construction machine according to the preferred embodiment of the present invention in which a fuel tank is separated from a counterweight in a state where the counterweight is fixed to an upper frame.
Figure 7:
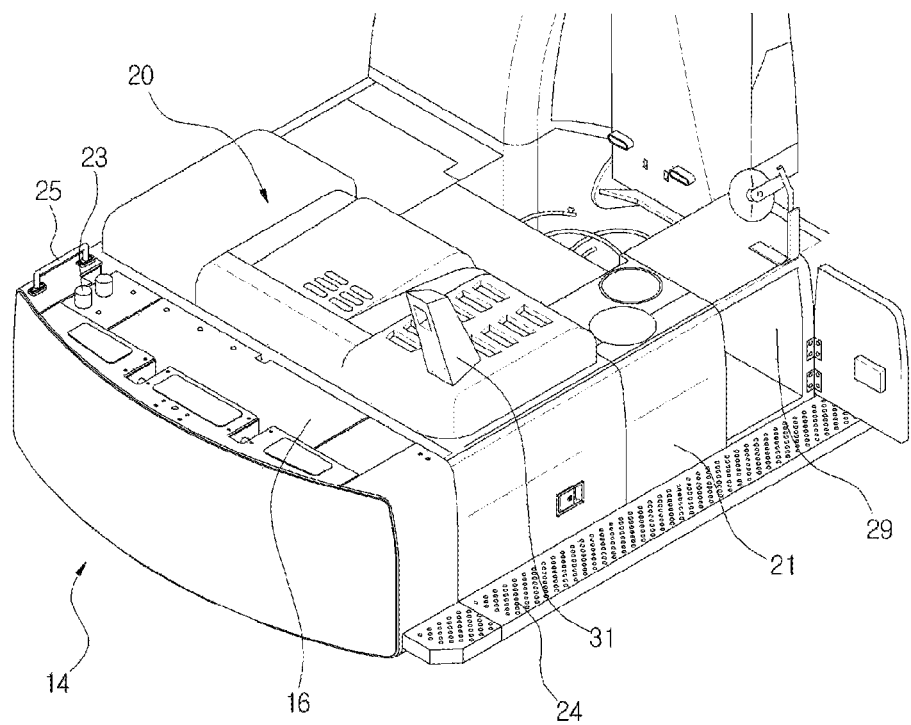
FIG. 7 is a view showing a form of the construction machine according to the preferred embodiment of the present invention in which the counterweight coupled to the fuel tank is mounted to the upper frame.
Figure 8:
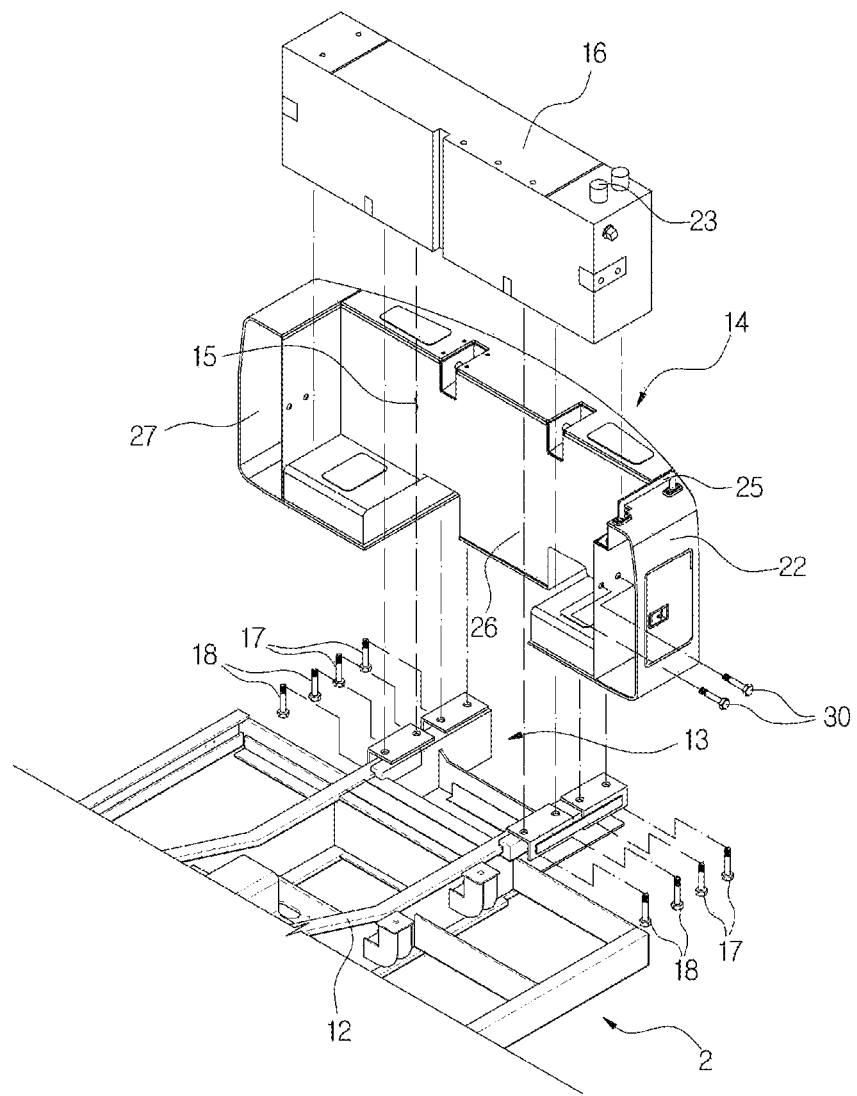
FIG. 8 is a view of main portions extracted from a construction machine according to another preferred embodiment of the present invention.
Figure 9:
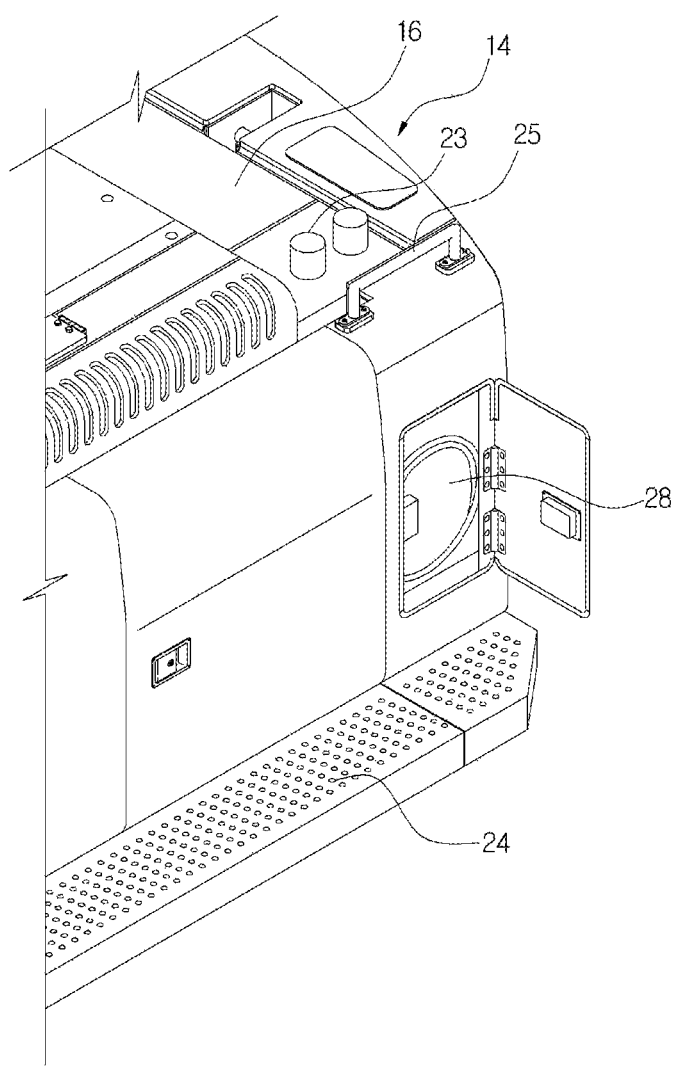
FIG. 9 is a main portion-extracted view of the counterweight mounted to the upper frame with regard to the construction machine according to the preferred embodiment of the present invention.

FIG. 3 is a perspective view of a counterweight of a construction machine according to a preferred embodiment of the present invention; FIG. 4 is a view showing a portion of the counterweight illustrated in FIG. 3 that is filled with inner fillers; FIG. 5 is an exploded perspective view showing main portions extracted from the construction machine according to the preferred embodiment of the present invention; FIG. 6 is a view showing a form of the construction machine according to the preferred embodiment of the present invention in which a fuel tank is separated from a counterweight in a state where the counterweight is fixed to an upper frame; FIG. 7 is a view showing a form of the construction machine according to the preferred embodiment of the present invention in which the counterweight coupled to the fuel tank is mounted to the upper frame; FIG. 8 is a view of main portions extracted from a construction machine according to another preferred embodiment of the present invention; and FIG. 9 is a main portion-extracted view of the counterweight mounted to the upper frame with regard to the construction machine according to the preferred embodiment of the present invention.

Referring to FIGS. 3 to 7, and 9, a construction machine according to an embodiment of the present invention includes: a lower driving structure (not shown); an upper frame 2 mounted on the lower driving structure to horizontally swivel; a cab (not shown) mounted on one side of an upper surface of the upper frame 2; a mounting portion 13 formed to extend from a rearmost side of a center frame 12 of the upper frame 2; a counterweight 14 detachably installed on the mounting portion 13 through a fastening member 17, and having a storage space portion 15 of which a front surface and an upper surface are opened; a fuel tank 16 coupled to the storage space portion 15 and detachably fixed to the mounting portion 13 through another fastening member 18 that fixes the counterweight 14 to the mounting portion 13 in order to separate the fuel tank 16 from the counterweight 14 in a state where the counterweight 14 that is coupled to the fuel tank 16 is mounted on the mounting portion 13; an engine room 20 mounted to be adjacent to a front portion of the fuel tank 16 of the upper frame 2; and a hydraulic fluid tank (oil tank) 21 installed to be adjacent to one side of a front portion of the engine room 20.

The construction machine may include a wing-shaped protection member 22 formed to project from left and right sides of the counterweight 14 and to surround left, right and outer surfaces of the fuel tank 16 that is coupled to the storage space portion 15, thereby preventing the fuel tank 16 from coming in contact with an external object.

A fuel injection port (filing hole) 23 of the fuel tank 16 may be formed on an opposite side of a muffler 31 of the engine room 20.

The construction machine may include a maintenance platform 24 installed on a side surface of the upper frame 2, wherein the maintenance platform 24 may be formed to extend up to a rear part of one side surface of the counterweight 14 for boarding during fuel injection into the fuel tank 16.

The construction machine may include a handrail 25 installed on one side of an upper surface of the counterweight 14 to be grasped during the fuel injection into the fuel tank 16.

The counterweight 14 may include a body portion 26 filled with predetermined inner fillers to maintain a predetermined weight, and a storage portion 27 formed at left and right ends of the body portion 26 and having a vacancy that is not filled with the inner fillers.

A fuel injection pump (fuel filler pump) 28 for injecting fuel into the fuel tank 16 may be installed on one side of the storage portion 27.

The construction machine may further include a storage box 29 installed to be adjacent to a front part of the hydraulic fluid tank 21 of the upper frame 2.

Reference numeral 19 in the drawing is a bracket formed on the counterweight 14 and coupled to a fastening member 18 to install the counterweight (14) coupled to the fuel tank 16 on the mounting portion 13.

Thanks to the configuration described above, after the fuel tank 16 has been coupled to the storage space portion 15 of the counterweight 14, the counterweight 14 is seated on the mounting portion 13 formed to extend from a rearmost side of the center frame 12. The counterweight 14 may be fixed to the mounting portion 13 via the fastening member 17 coupled to a bottom surface of the mounting portion 13 and screw-coupled to the counterweight 14. The fuel tank 16 and the counterweight 14 may be simultaneously fixed to the mounting portion 13 via another fastening member 18 coupled to the bracket 19 formed at the counterweight 14.

Since the fuel tank 16 is coupled to the storage space portion 15 of the counterweight 14, stability of the construction machine can be maintained even in a state where a weight of the counterweight 14 is reduced.

Accordingly, since the left, right and outer surfaces of the fuel tank 16 are surrounded and supported by the wing-shaped protection member 22 formed on left and right sides of the counterweight 14, the fuel tank 16 can be prevented from being damaged due to a contact between the fuel tank 16 and an external object during working.

Meanwhile, since the maintenance platform 24 installed on the side surface of the upper frame 2 is formed to extend up to the rear part of one side surface of the counterweight 14, a user may board the maintenance platform 24 during fuel injection into the fuel tank 16 so that convenience can be provided. In addition, the user may grasp the handrail 25 installed on the upper surface of the counterweight 14 during fuel injection in a state where the user boards the maintenance platform, so that the user can maintain a stable posture.

Meanwhile, the counterweight 14 includes the body portion 26 filled with inner fillers to maintain a predetermined weight, and the storage portion 27 having the vacancy that is not filled with the inner fillers. Due to this, in the case where the fuel injection pump 28 for injecting fuel into the fuel tank 16 is installed on one side of the storage portion 27, convenience may be provided during fuel injection into the fuel tank 16.

Meanwhile, since the fuel injection port 23 of the fuel tank 16 is formed in an opposite direction of the muffler 31 of the engine room 20, the occurrence of a fire danger may be blocked.

Meanwhile, since the fuel tank 16 is coupled to the storage space portion 15 of the counterweight 14 and is installed at the mounting portion 13, the storage box 29 installed in front of the hydraulic fluid tank 21 may be utilized as a space in which tools required during working or the like can be loaded.

Meanwhile, in the state where the fuel tank 16 is coupled to the storage space portion 15 of the counterweight 14 such that the counterweight 14 is mounted on the mounting portion 13, only the fuel tank 16 may be separated from the counterweight 14 without separating the counterweight 14 from the mounting portion 13. That is, in the case where the fastening member 18, which is coupled to the bracket 19 formed on the counterweight 14 and fixes the fuel tank 16 and the counterweight 14 to the mounting portion 13, is separated, the fuel tank 16 may be separated from the counterweight 14. In this case, the counterweight 14 may be maintained in a state of being fixed to the mounting portion 13 thanks to the fastening member 17 that fixes the counterweight 14 to the mounting portion 13.

As described above, in the state where the fuel tank 16 and the counterweight 14 are mounted to the mounting portion 13, only the fuel tank 16 may be separated from the mounting portion 13 so that a loss time required for simultaneously disassembling the fuel tank 16 and the counterweight 14 can be reduced, and a working process for separating the fuel tank 16 is not required after separating the counterweight 14.

In addition, since the fuel tank 16 is separated from the counterweight 14, it is easy to handle the fuel tank 16, which is light in weight, compared to a conventional structure in which the fuel tank and the counterweight are integrally formed, so that workability for forming a corrosion-resistant phosphate coating layer on an inner surface of the fuel tank 16 can be improved.

Referring to FIG. 8, a construction machine according to another embodiment of the present invention includes: a lower driving structure (not shown); an upper frame 2 mounted on the lower driving structure to horizontally swivel; a cab (not shown) mounted on one side of an upper surface of the upper frame 2; a mounting portion 13 formed to extend from a rearmost side of a center frame 12 of the upper frame 2; a counterweight 14 detachably installed on the mounting portion 13 through a fastening member 17, the counterweight 14 having a storage space portion 15 of which a front surface and an upper surface are opened; a fuel tank 16 coupled to the storage space portion 15, the fuel tank being detachably fixed to the mounting portion 13 through another fastening member 18, and being detachably fixed to a predetermined position of the counterweight 14 through still another fastening member 30 in order to separate the fuel tank 16 from the counterweight 14 in a state where the counterweight 14 that is coupled to the fuel tank 16 is mounted on the mounting portion 13; an engine room (not shown) mounted to be adjacent to a front part of the fuel tank 16 of the upper frame 2; and a hydraulic fluid tank (not shown) installed to be adjacent to one side of a front part of the engine room 20.

The still another fastening member 30 for detachably fixing the fuel tank 16 to the counterweight 14 may fix the fuel tank 16 to at least one of left and right sides, a top surface, and a bottom surface of the counterweight 14.

After the fuel tank 16 has been coupled to the storage space portion 15 of the counterweight 14, in the state where the counterweight 14 is fastened to the mounting portion 13 via the fastening member 17, only the fuel tank 16 may be separated from the counterweight 14.

That is, when the still another fastening member 30 that fixes the fuel tank 16 to at least one of the left and right sides, the top surface, and the bottom surface of the counterweight is separated, and the fastening member 18 that fixes the fuel tank 16 to the mounting portion 13 is separated, only the fuel tank 16 may be separated from the counterweight 14 in the state where the counterweight 14 is fixed to the mounting portion via the fastening member 17.

Meanwhile, in order to separate only the counterweight 14 from the mounting portion 13 in the state where the counterweight coupled to the fuel tank 16 coupled to the storage space portion 15 is mounted to the mounting portion 13 via the fastening member 17, when the fastening member 17 that fixes the counterweight 14 to the mounting portion 13 is separated, and the fastening member 30 that fixes the fuel tank 16 to the counterweight 14 is separated, only the counterweight 14 may be separated from the mounting portion 13 (wherein the fuel tank 16 is maintained in a state of being fixed to the mounting portion 13 via the fastening member 18).

Meanwhile, when the fastening members 17, 18 are separated from the mounting portion 13 in the state where the counterweight 14 coupled to the fuel tank 16 coupled to the storage space portion 15 is fastened to the mounting portion 13 via the fastening member 17 (wherein the fuel tank 16 is fixed to the mounting portion via the fastening member 18), the fuel tank 16 and the counterweight 14 coupled to the fuel tank 16 may be simultaneously separated from the mounting portion 13.

Although the present invention is described with reference to the preferred embodiments, the present invention is not limited to only the embodiments set forth herein, and those skilled in the art will appreciate that the present invention can be embodied in many alternate forms that may be included within the spirit and scope of the present invention as defined by the appended claims.

INDUSTRIAL APPLICABILITY

According to the present invention having the configuration described above, only a fuel tank is separated from a counterweight after a counterweight coupled to the fuel tank has been mounted to an upper frame, so that loss time required for simultaneously disassembling the fuel tank and the counterweight can be reduced.

In addition, since left, right and outer surface of the fuel tank are surrounded and supported by the counterweight, the fuel tank can be prevented from coming into contact with an external object during working.

Also, left and right sides of the counterweight are not filled with inner fillers for maintaining a weight so as to be utilized as a storage space in which a fuel injection pump is installed.

In addition, a fuel injection port is formed on an opposite side of a muffler of an engine room so that fire can be prevented from occurring.

Also, when a corrosion-resistant phosphate coating layer is formed on an inner surface of the fuel tank, since it is easy to handle the fuel tank compared to a conventional structure in which the fuel tank and the counterweight are integrally formed, workability can be improved.

The invention claimed is:
1. A construction machine comprising:
a lower driving structure;
an upper frame mounted on the lower driving structure to horizontally swivel;
a cab mounted on one side of an upper surface of the upper frame;
a mounting portion formed to extend from a rearmost side of a center frame of the upper frame;
a counterweight detachably installed on the mounting portion through a first fastening member, and having a storage space portion of which a front surface and an upper surface are opened;
a fuel tank coupled to the storage space portion and detachably fixed to the mounting portion through a second fastening member that fixes the counterweight to the mounting portion in a state where the fuel tank is mounted on the mounting portion and disposed in the storage space;
an engine room mounted in front of the fuel tank of the upper frame; and
a hydraulic fluid tank installed on one side of a front portion of the engine room.
2. The construction machine according to claim 1, further comprising a wing-shaped protection member formed to project from left and right sides of the counterweight and to surround an outer surface of the fuel tank that is coupled to the storage space portion in order to prevent the fuel tank from coming in contact with an external object.

3. The construction machine according to claim 1, wherein a fuel injection port of the fuel tank is formed on an opposite side of a muffler of the engine room.

4. The construction machine according to claim 1, further comprising a maintenance platform installed on a side surface of the upper frame and formed to extend up to a rear side of one side surface of the counterweight for boarding during fuel injection into the fuel tank.

5. The construction machine according to claim 4, further comprising a hand rail installed on one side of an upper surface of the counterweight to be grasped during the fuel injection into the fuel tank.

6. The construction machine according to claim 1, wherein the counterweight comprises a body portion filled with predetermined inner fillers to maintain a predetermined weight, and a storage portion formed at left and right ends of the body portion and having a vacancy that is not filled with the inner fillers.

7. The construction machine according to claim 6, further comprising a fuel injection pump installed on one side of the storage portion to inject fuel into the fuel tank.

8. The construction machine according to claim 1, further comprising a storage box installed in front of the hydraulic fluid tank of the upper frame.

9. The construction machine according to claim 1, further comprising a bracket formed on the counterweight and coupled to a fastening member to install the counterweight coupled to the fuel tank on the mounting portion.

\* \* \* \* \*